United States Patent
Kanamori

(10) Patent No.: US 8,221,625 B2
(45) Date of Patent: Jul. 17, 2012

(54) PROCESS FOR PRODUCING POLYOLEFIN RESIN COMPOSITION AND FILTER DEVICE FOR USE IN THIS PROCESS

(75) Inventor: Kazunori Kanamori, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 387 days.

(21) Appl. No.: 12/507,137

(22) Filed: Jul. 22, 2009

(65) Prior Publication Data
US 2010/0022735 A1    Jan. 28, 2010

(30) Foreign Application Priority Data

Jul. 24, 2008 (JP) ................. P2008-191133

(51) Int. Cl.
*B01D 25/00* (2006.01)
*B01D 29/00* (2006.01)
*B01D 35/00* (2006.01)
*B01D 29/46* (2006.01)
*B01D 39/14* (2006.01)
*B01D 39/10* (2006.01)

(52) U.S. Cl. ........ 210/335; 210/773; 210/445; 210/450; 210/453; 210/455; 210/488; 210/489; 210/496; 210/499; 210/510.1

(58) Field of Classification Search .......... None
See application file for complete search history.

(56) References Cited

U.S. PATENT DOCUMENTS 3,768,661 A * 10/1973 Coates .................. 210/449
5,730,885 A    3/1998 Blakeslee et al.

FOREIGN PATENT DOCUMENTS

| JP | 61-218606 A | 9/1986 |
| JP | 61-287904 A | 12/1986 |
| JP | 7-216017 A | 8/1995 |
| JP | 9-038423 A | 2/1997 |
| JP | 2000-511967 A | 9/2000 |
| JP | 2006-088081 A | 4/2006 |
| WO | 03/099417 A1 | 12/2003 |

* cited by examiner

*Primary Examiner* — Benjamin Kurtz
(74) *Attorney, Agent, or Firm* — Sughrue Mion, PLLC

(57) ABSTRACT

The filter device 10 according to the present invention is a device for filtering a polyolefin resin composition containing a polyolefin ingredient, wherein the device comprises a main body 10a having a flow passage 10b, a sintered metal filter 13 having a filtration accuracy of 1 to 100 μm, a wire netting 14a having a line diameter of 0.01 to 0.25 mm and abutting the sintered metal filter 13 on one side thereof, and a supporting member 15 having a thickness of 10 to 100 mm and having a plurality of openings 15d with an aperture ratio of 30 to 60%; and the sintered metal filter 13, wherein the wire netting 14a and the supporting member 15 are disposed in this order from the upstream to the downstream of the flow passage 10b; and the sintered metal filter 13 is fixed to the main body 10a through the seal member 18.

7 Claims, 12 Drawing Sheets

Fig.5
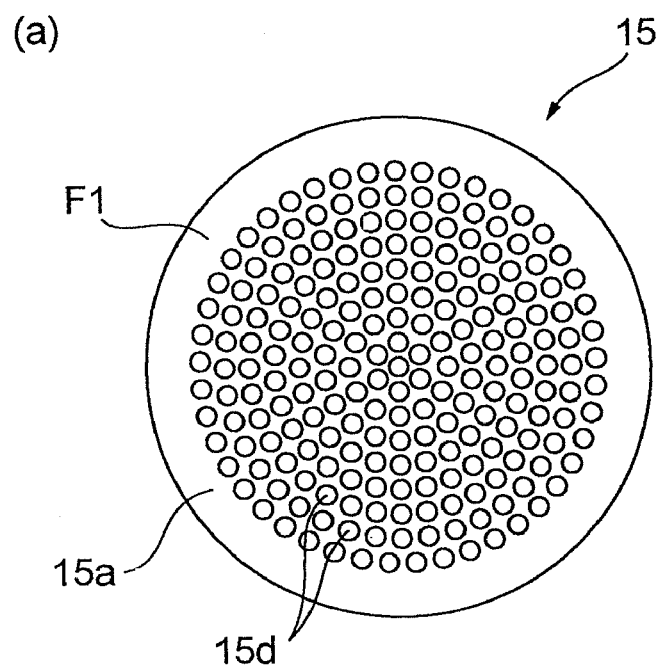
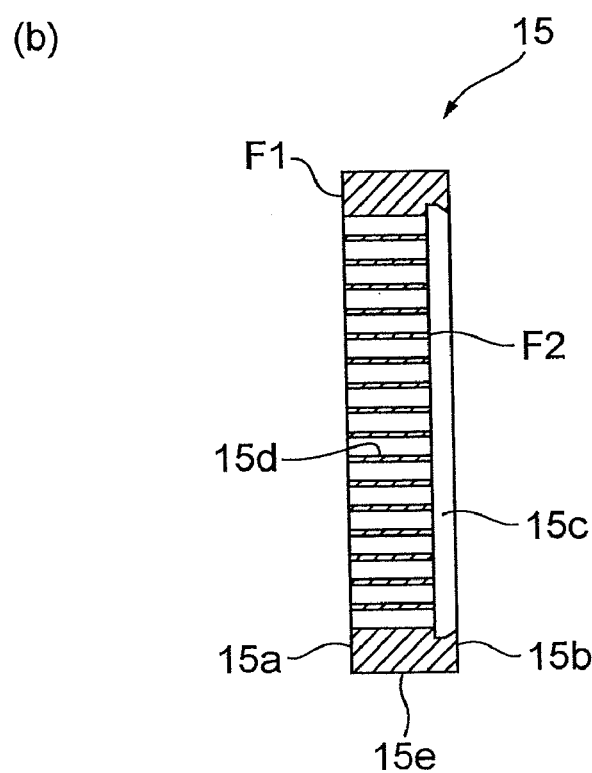

Fig.7
(a)
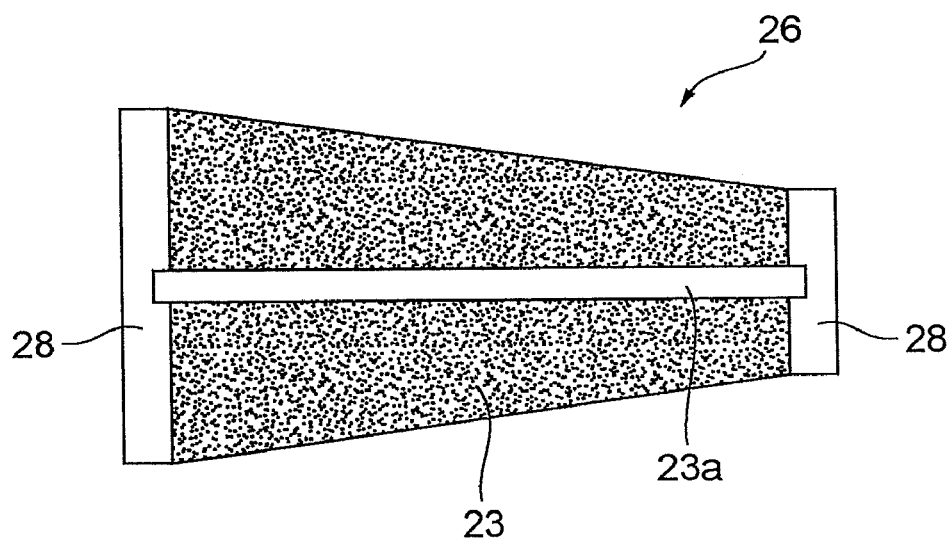
(b)
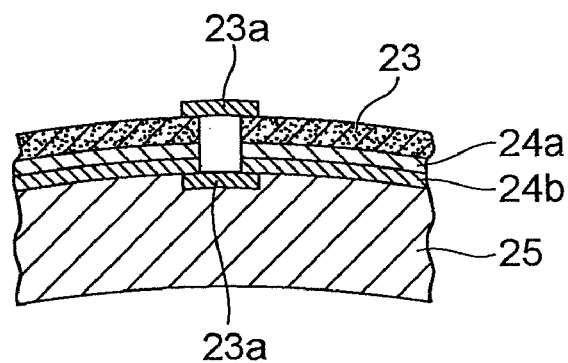
(c)
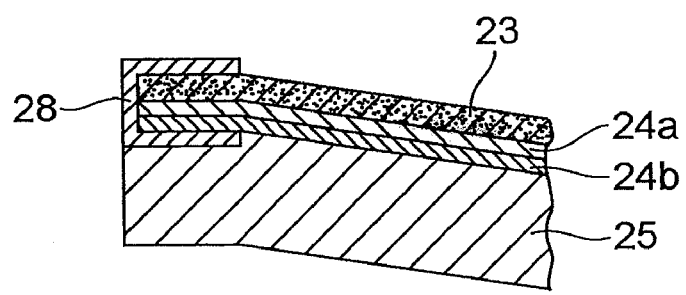

Fig.9
(a)
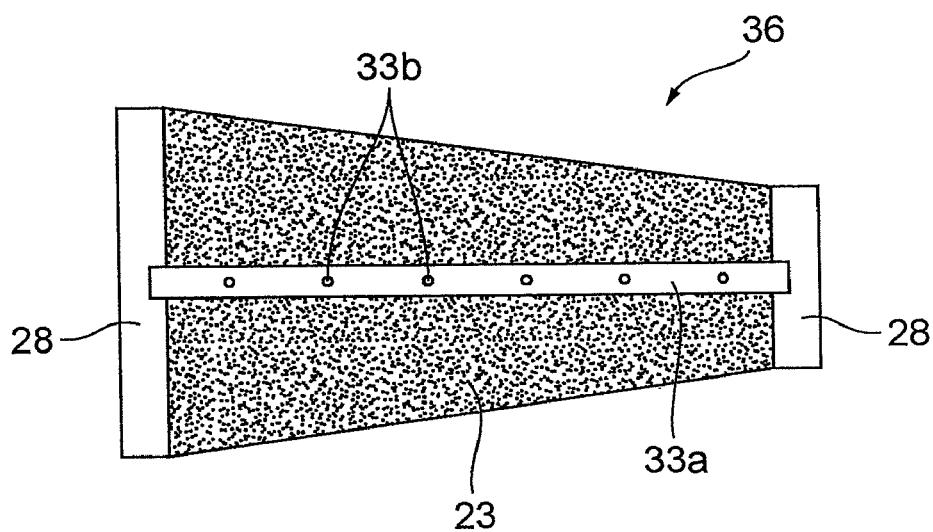
(b)
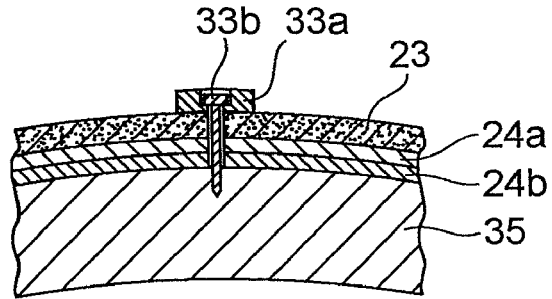
(c)
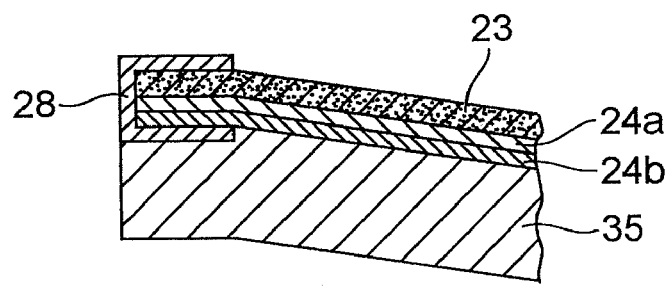

PROCESS FOR PRODUCING POLYOLEFIN RESIN COMPOSITION AND FILTER DEVICE FOR USE IN THIS PROCESS

BACKGROUND OF THE INVENTION

1. Field of the Invention

The present invention relates to a process for producing a polyolefin resin composition containing one or two or more polyolefin ingredients and a filter device for use in this.

2. Related Background Art

Polyolefin resin compositions are excellent in various performances such as mechanical strength, heat seal performance, chemical resistance and food hygienic properties, and therefore they are widely used as materials of polymer films, and so on. In recent years, these polyolefin resin compositions have begun to be used for packaging of more expensive contents and for members of expensive industrial products, and demand for their quality has become severer than before.

If contaminants such as gel-like carbonized polymers or dust are contained in a polyolefin resin composition, a minute defect is caused on the surface of a molded film of the polyolefin resin composition, which results in deterioration in appearance. This circular defect is sometimes called a "fisheye" because of its similarity to the shape of a fisheye.

On this account, as a method for removing contaminants from a polyolefin resin composition, methods in which the composition is filtered through a metal mesh, sintered metal filters such as a metal fiber sintered body and a metallic powder sintered body are known (see, for example, Japanese Patent Laid-Open No. 2006-88081).

A filter excellent in filtration accuracy is usually used in the filtration method mentioned above so as to sufficiently suppress the occurrence of the minute defects (fisheyes). However, when a higher quality is required, use of the filter having excellent filtration accuracy may be insufficient to give a resin composition which meets the requirements. Accordingly, the structure of the filter itself is studied in addition to the improvement in the filtration accuracy of the filter. For example, Japanese Patent Laid-Open No. 2006-88081, Japanese Patent Laid-Open No. H9-38423, and WO 2003/099417 describe filtration method using a leaf disk type filter or a pleated filter.

In the meantime, among polyolefin resin compositions, polyolefin resin compositions containing a plurality of polyolefin ingredients are studied in order to meet the demands for achieving various kinds of physical properties and workability (low probability of causing "die drool" or "streaks") in the high level with the diversification of products. Since such polyolefin resin compositions are liable to cause gel due to poor dispersion of each ingredient, techniques to use the filter of various kinds have been suggested (see, for example, National Publication of International Patent Application No. 2000-511967).

SUMMARY OF THE INVENTION

However, the filter device comprising a leaf disk type filter or a pleated filter has room for improvement in pressure resistance, and it was difficult to sufficiently increase the pressure for filtering a melt of a polyolefin resin composition. That is, there are cases where members for holding the filter cannot endure the pressure and are damaged when filtration is performed with the filter device as mentioned above at a filtration pressure higher than the pressure allowable for the device. In this case, a melt in which contaminants are not sufficiently reduced flow to the downstream of the filter. If such a situation occurs, molded articles obtained from the polyolefin resin composition become unsatisfactory in the quality such as the appearance thereof.

The present invention has been made in consideration of the above problems and an object thereof is to provide a filter device with which contaminants contained in the polyolefin resin composition can be effectively removed and which is useful for producing molded articles having excellent appearance. Another object of the present invention is to provide a process for producing a polyolefin resin composition using the filter device.

The filter device for a polyolefin resin composition according to the present invention is a device for filtering a melt of a polyolefin resin composition containing one or two or more polyolefin ingredients, wherein the device comprises a main body having a flow passage through which the melt is transferred; a sintered metal filter having a filtration accuracy of 1 to 100 µm; a wire netting having a line diameter of 0.01 to 0.25 mm and abutting the sintered metal filter on one side thereof; a supporting member supporting the sintered metal filter and the wire netting, having a thickness of 10 to 100 mm and having a plurality of openings penetrating in the thickness direction with an aperture ratio of 30 to 60%; and a seal member disposed so as to cover the edge of the sintered metal filter; wherein the sintered metal filter, the wire netting and the supporting member are disposed in this order from the upstream to the downstream of the flow passage and the sintered metal filter is fixed to the main body through the seal member.

The filter device according to the present invention has a layered unit having a sintered metal filter, a wire netting and a supporting member disposed in the flow passage. The filter device of the present invention exhibits an effect that the filtration treatment of the melt can be performed under high filtration pressure in addition to the effect that contaminants can be sufficiently removed by the sintered metal filter. Due to this, sufficiently high filtration rate can be achieved and throughput per unit time is improved. Therefore, effective filtration treatment is enabled.

The high pressure resistance of the filter device according to the present invention is mainly achieved by the constitution of the layered unit mentioned above and the method for fixing the layered unit. That is, firstly, since the sintered metal filter abuts the wire netting of a predetermined line diameter (0.01 to 0.25 mm), when the sintered metal filter is pressed in the direction of the supporting member by the pressure of a melt, distortion of the sintered metal filter can be suppressed sufficiently. Thus the leak due to the distortion of the sintered metal filter can be reduced sufficiently. Secondly, since the sintered metal filter is fixed to the main body through a seal member, the leak at the joint between the main body and the sintered metal filter can be reduced sufficiently.

When the melt containing two or more polyolefin ingredients are filtered, the filter device of the present invention enables to remove the contaminants and at the same time highly disperse each of the ingredients by allowing each of the ingredients contained in the melt to pass through the sintered metal filter having a filtration accuracy of 1 to 100 µm. Molded products with sufficiently little occurring of the fisheye and with excellent appearance can be produced using a raw material composition in which each of the ingredients is highly dispersed.

A supporting member with an aperture ratio of 30 to 60% is used in the present invention. The "aperture ratio" as used herein refers to a value calculated by dividing the total opening area by the total area of the one side of the sintered metal filter (except the circumferential part covered with the main body).

It is preferable in the filter device according to the present invention that the sintered metal filter, the wire netting and the supporting member be detachably attached to the main body. Adopting such a constitution is advantageous in that each of the constituting members can be easily exchanged and/or washed.

In the filter device according to the present invention, each of the sintered metal filter, the wire netting and the supporting member may have a circular or cylindrical outer shape. The shape of the layered unit containing the sintered metal filter, the wire netting and the supporting member may be appropriately selected depending on the structure of the main body.

In the case of using a sintered metal filter having a cylindrical outer shape, it is preferable to use a filter prepared by rolling a sintered metal body sheet into a cylinder and then pressure bonding a joint of the rolled sintered metal sheet with a resin member or a metal member. Alternatively, it is preferable to use a filter without a joint on the surface as the sintered metal filter. Leak from the joint of the sintered metal filter can be sufficiently reduced by using these sintered metal filters.

The process for producing a polyolefin resin composition according to the present invention is characterized in that the process comprises a melting step for preparing a melt containing one or two or more polyolefin ingredients, and a filtration step for filtering the melt with the above filter device according to the present invention.

According to the production process of the present invention, filtered fluid with a sufficiently reduced content of the contaminants can be effectively obtained as a result of using a filter device having a constitution mentioned above. On this account, polyolefin resin compositions useful for producing molded products with excellent appearance can be effectively produced.

In addition, when polyolefin resin compositions are produced from the melt containing two or more polyolefin ingredients, the production process of the present invention enables to remove the contaminants contained in the melt and at the same time highly disperse each of the ingredients by allowing each of the ingredients contained in the melt to pass through the sintered metal filter having a filtration accuracy of 1 to 100 µm in the filtration step. Molded products with sufficiently little occurring of the fisheye and with excellent appearance can be produced using a raw material composition in which each of the ingredients is highly dispersed.

According to the present invention, a filter device which enable to effectively remove contaminants contained in a polyolefin resin composition and is useful for producing molded products with excellent appearance and a process for producing a polyolefin resin composition using the filter device are provided.

BRIEF DESCRIPTION OF THE DRAWINGS

FIG. 5 illustrates an example of a circular breaker plate;

FIG. 7 illustrates an example of the constitution of the layered unit illustrated in FIG. 6;

FIG. 9 illustrates another example of the constitution of the layered unit illustrated in FIG. 6;

DESCRIPTION OF THE PREFERRED EMBODIMENTS

Figure 1:
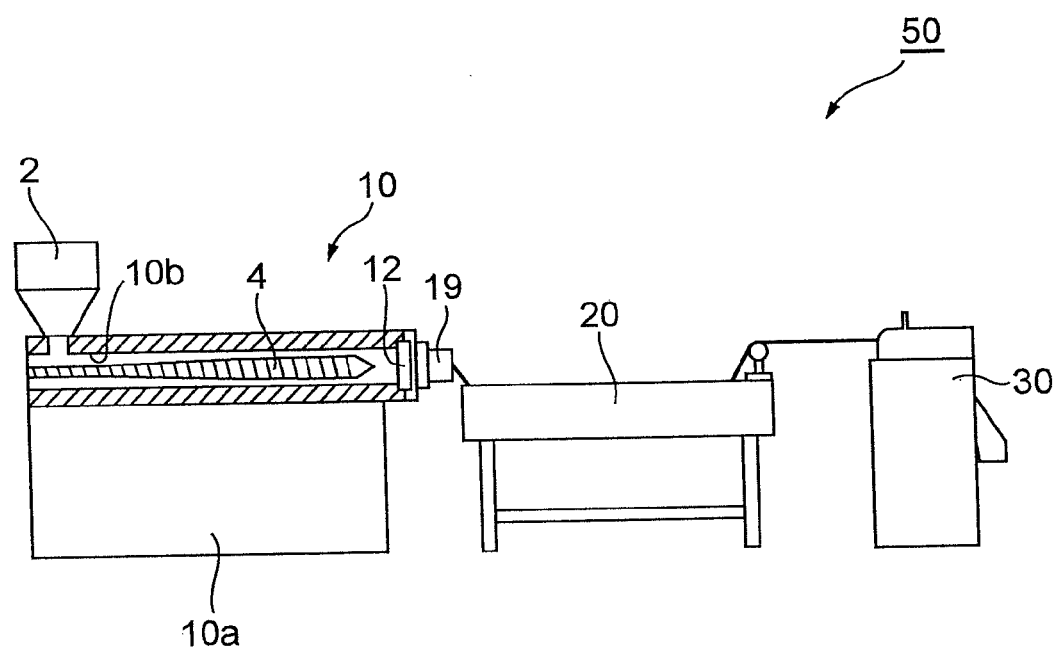
FIG. 1 is a schematic view illustrating the first embodiment of the production system comprising a filter device according to the present invention.

Hereinbelow, preferable embodiments of the present invention will be described referring to the drawings.

First Embodiment

Production System of Polyolefin Resin Composition

Firstly, the first embodiment of the production system of the polyolefin resin composition is described referring to FIGS. 1 to 5. FIG. 1 is a schematic view illustrating a production system according to this embodiment. A production system 50 shown in the drawing is a system to produce polyolefin resin compositions containing two or more polyolefin ingredients.

The production system 50 comprises a filter device 10 which melt-kneads two or more polyolefin ingredients to obtain a melt and filters the melt to obtain a filtered fluid; a water tank 20 which cools and solidifies the filtered fluid; and a pelletizer 30 which produces pellets from the solidified product.

The filter device 10 has a hopper 2, from which raw materials such as polyolefins are cast in, at the inlet side of the main body section 10a of the device. The main body section 10a of the device has a flow passage 10b to transfer the substances to be treated, and one or a plurality of screw(s) 4 therein. The raw material composition cast into the hopper 2 moves to the downstream side in the flow passage 10b while being mixed by the screw 4 and heated to be a melt by a heater (not illustrated) built in the main body section 10a of the device.

As a main body section 10a of the device of the filter device 10, commercially available extruders can be used. Specifically, a single screw extruder, co-rotating twin screw extruder, counter-rotating twin screw extruder, etc. can be used. Examples of a co-rotating twin screw extruder include TEM (registered trademark) produced by Toshiba Machine Co., Ltd., TEX (registered trademark), and CMP (registered trademark) produced by the Japan Steel Works, Ltd. and, examples of a counter-rotating twin screw extruder include TEX (registered trademark), and CMP (registered trademark) produced by the Japan Steel Works, Ltd. and FCM (registered trademark), NCM (registered trademark), and LCM (registered trademark) produced by Kobe Steel, Ltd.

Figure 2:
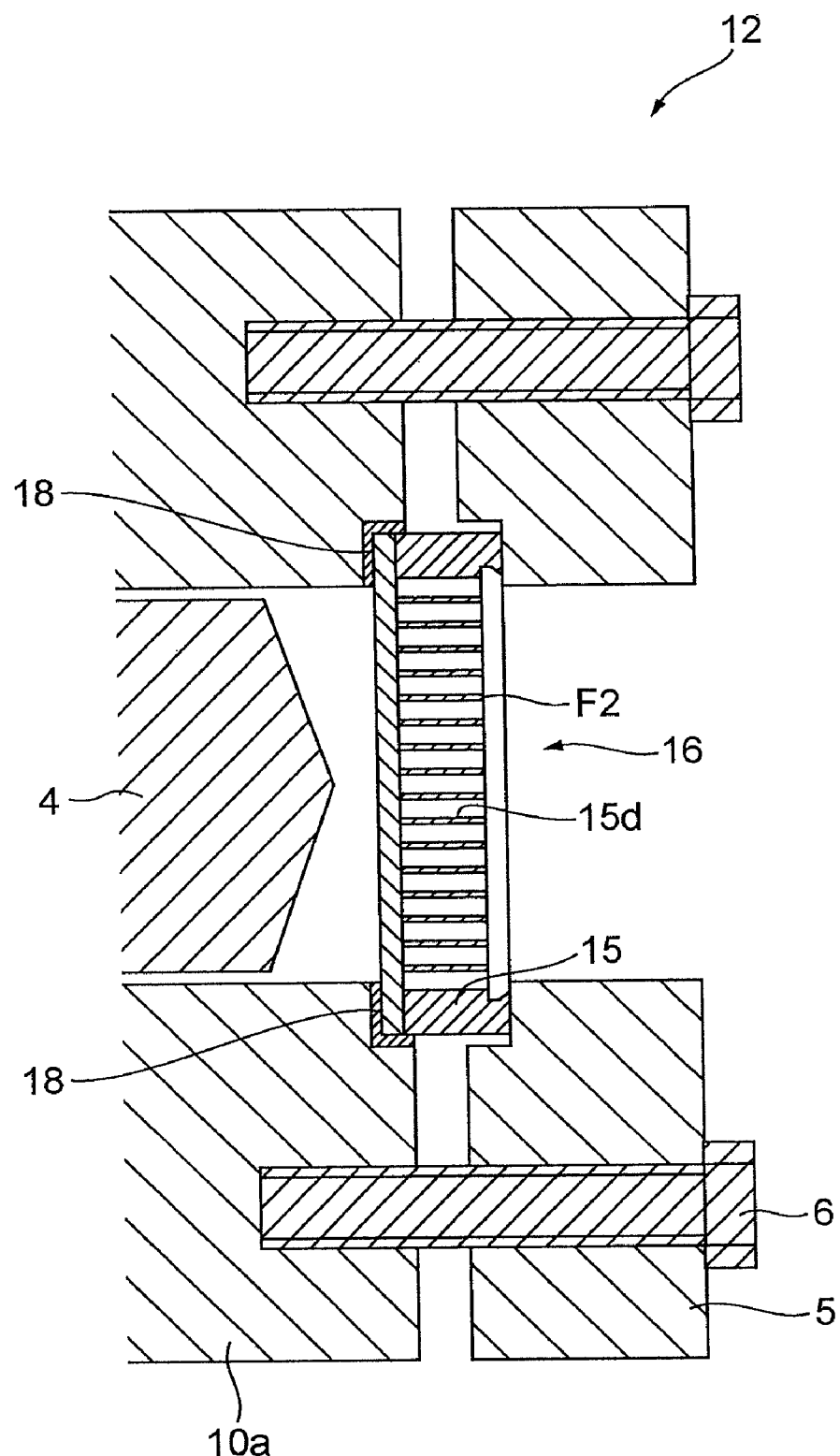
FIG. 2 is a schematic cross-sectional view illustrating an example of the filter mechanism of a filter device according to the present invention.
Figure 3:
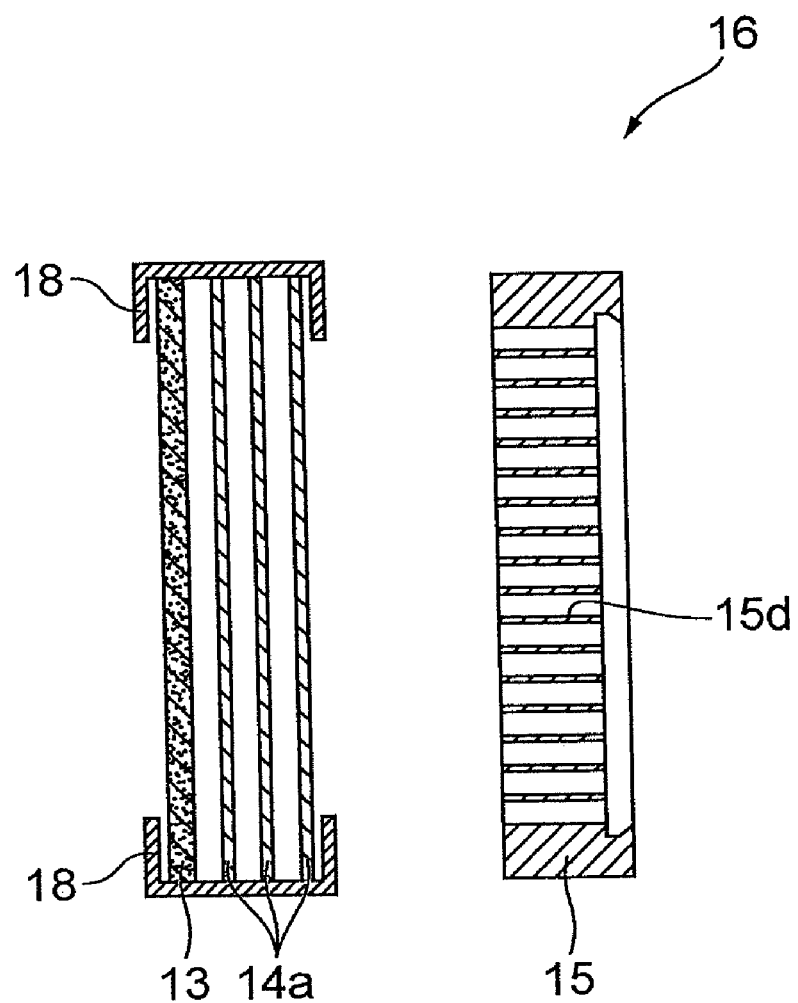
FIG. 3 is a schematic cross-sectional view illustrating an example of disposition relationship of members for forming the layered unit illustrated in FIG. 2.

The filter device 10 has a filter mechanism 12 in the outlet side of the main body section 10a of the device. FIG. 2 is a schematic cross-sectional view illustrating the constitution of the filter mechanism 12. The filter mechanism 12 is provided for filtering a melt transferred by screw 4, and comprises a flange 5 and a bolt 6 for fixing a layered unit 16 in the main body section 10a of the device. FIG. 3 is a schematic cross-sectional view illustrating the disposition relationship of respective members constituting the layered unit 16 which the filter mechanism 12 comprises. As shown in FIG. 3, the layered unit 16 which the filter mechanism 12 comprises has a sintered metal filter 13 and a wire netting 14a and a breaker plate (supporting member) 15 disposed in this order from the upstream to the downstream of the flow passage 10b. Here in FIG. 3, layered unit 16 is illustrated in the condition in which respective members are separated from each other but this is for the purpose of exhibiting the disposition relationship, and actually respective members abut each other.

All of the sintered metal filter 13, the wire netting 14a and the breaker plate 15 are circular in the outer shape, and are fixed to the main body section 10a of the device with a seal member 18. The seal member 18 is disposed so as to cover the edge of the sintered metal filter 13 and to be located at the part where the layered unit 16 and the main body section 10a of the device abut each other.

The sintered metal filter 13 is provided to remove the contaminants contained in the a melt by allowing the melt to pass through and to disperse respective polyolefin ingredients with each other. As a sintered metal filter 13, those produced by sintering stainless steel (SUS316L) fiber can be used, for example. Commercially available sintered metal filters can be used, for example, Naslon (product name) produced by Nippon Seisen Co., Ltd., etc.) can be preferably used.

The sintered metal filter 13 has a filtration accuracy of 1 to 100 μm. The filtration accuracy as used herein means the size of particles 95% of which are trapped when a filtering test based on JIS-B8356 is performed. When the filtration accuracy is less than 1 μm, sufficient amount of a melt cannot be filtered per unit time if the filtration pressure is lower than the allowable pressure or more of the filter device. On the other hand, when the filtration accuracy exceeds 100 μm, removal of contaminants and dispersion of respective ingredients become insufficient and fisheye reduction effect becomes insufficient. The filtration accuracy of the sintered metal filter 13 is preferably 10 to 60 μm, and more preferably 20 to 40 μm.

One piece or two or more pieces of the wire netting 14a is disposed on the downstream side of the sintered metal filter 13 and the wire netting 14a is directly in contact with the sintered metal filter 13. It is preferable that a line diameter of the wire netting 14a be 0.01 to 0.25 mm. In the case that the line diameter of the wire netting 14a is less than 0.01 mm, the sintered metal filter 13 tends to be deformed or broken when the sintered metal filter 13 was pushed into an opening 15d of the breaker plate 15 by filtration pressure. On the other hand, when the line diameter of the wire netting 14a exceeds 0.25 mm, wires constituting the wire netting 14a bite into the sintered metal filter 13 during filtration, which may cause deformation of the sintered metal filter 13 and decrease in the filtration accuracy. The line diameter of the wire netting 14a is preferably 0.03 to 0.23 mm, and more preferably 0.05 to 0.20 mm. In addition, the mesh count of the wire netting 14a is preferably 30 to 500, and more preferably 40 to 150 mesh from a similar viewpoint of the line diameter of the wire netting 14a. The mesh count (mesh) of the wire netting as used herein means the number of meshes present within 1 inch (25.4 mm).

It is preferable that a plurality of pieces (for example, 2 to 10 pieces) of the wire netting 14a be disposed between the sintered metal filter 13 and the breaker plate 15 as shown in FIG. 3 from a viewpoint of more surely preventing occurrence of deformation or breakage of the sintered metal filter 13 in the opening 15d of the breaker plate 15.

Figure 4:
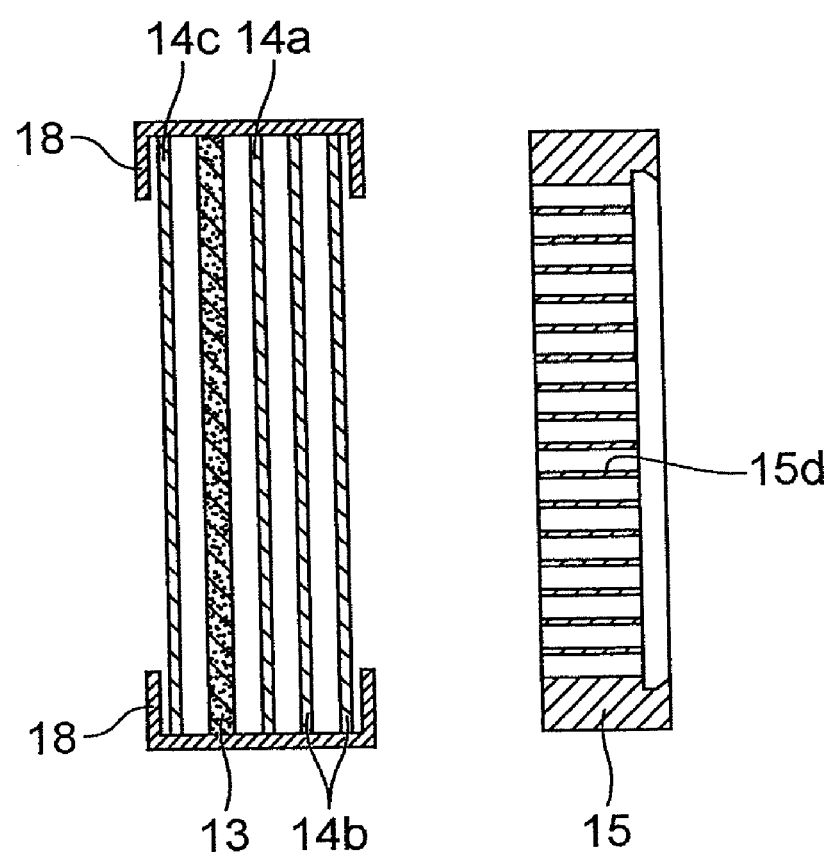
FIG. 4 is a schematic cross-sectional view illustrating another example of disposition relationship of members for forming the layered unit illustrated in FIG. 2.

Here, the layered unit 16 may have other wire nettings as long as the downstream side surface of the sintered metal filter 13 is directly in contact with the wire netting 14a (line diameter: 0.01 to 0.25 mm). For example, one piece or two or more pieces (for example, 2 to 10 pieces) of the wire netting 14b having a line diameter of 0.01 to 1 mm may be disposed between the wire netting 14a and the breaker plate 15 as shown in FIG. 4. In addition, a wire netting 14c having a line diameter of 0.01 to 0.25 mm may be further disposed so that the wire netting 14c can abut with the upstream side surface of the sintered metal filter 13 so as to prevent the sintered metal filter 13 from locally collapsing when the sintered metal filter 13 is set to the main body section 10a of the device.

The breaker plate 15 is to support the sintered metal filter 13 and the wire netting 14a. FIG. 5(A) is a front elevation view showing the upstream side surface of the breaker plate 15, and FIG. 5(B) is a cross-sectional view of the breaker plate 15. As shown in FIG. 5, whereas an upstream side surface F1 of the breaker plate 15 is configured so that an edge 15a may be in a plane with the other areas, a downstream side surface F2 is formed so that an edge 15b will rise while the other areas form a recessed part 15c.

It is preferable that the breaker plate 15 be a structure body which is hardly distorted even when the filtration pressure is imposed thereon. If the breaker plate 15 is deformed by filtration pressure, the sintered metal filter 13 and so on, which are supported by the breaker plate, may deform or break and contaminants become prone to leak to the downstream side. From this viewpoint, carbon steel, for example, is preferable as a material of the breaker plate 15. Examples of suitable materials other than carbon steel include special steels containing nickel, chrome, and tungsten. It is preferable that the thickness of the breaker plate 15 be 10 to 100 mm from a viewpoint of sufficiently securing the strength.

The breaker plate 15 has a plurality of openings 15d, each having a diameter of 1 to 10 mm, which penetrate in the thickness direction. The aperture ratio of the breaker plate 15 is 30 to 60%. When the breaker plate 15 having an aperture ratio less than 30% is used, a sufficient amount of a melt cannot be filtered per unit time unless the filtration pressure is increased to the allowable pressure or more of the filter device. On the other hand, when the breaker plate 15 having an aperture ratio more than 60% is used, a volume of deformation of the breaker plate 15 increases by the filtration pressure. The aperture ratio of the breaker plate 15 is preferably 30 to 55%, and more preferably 35 to 50%.

The seal member 18 is to prevent the melt from leaking to the downstream side through the edge 15a and a side 15e of the breaker plate 15. Packings made of a resin (for example, fluorinated resin) or a metal plate (for example, iron plate, aluminum plate, copper plate) can be preferably used as the seal member 18. It is preferable that the seal member 18 be disposed to integrally cover the edges of the sintered metal filter 13 and the wire netting 14a as shown in FIGS. 3 and 4.

The layered unit 16 (the sintered metal filter 13, the wire netting 14a, the breaker plate 15, etc.) is detachably attached to the main body section 10a of the device in the filter device 10. Adopting such a constitution is advantageous in that exchange and washing of each constitution member can be performed easily.

Fixing the layered unit 16 to the main body section 10a of the device may be carried out by stacking the sintered metal filter 13, the wire netting 14a, etc. on the surface F1 of the breaker plate 15 allowing the flange of the side of the main body section 10a of the device and the edge of the sintered metal filter 13 to abut with each other through the seal member 18 and fixing with bolts 6 after allowing the edge 15b and the flange 5 of the surface F2 of the breaker plate 15 to abut with each other (see FIG. 2).

Figure 12:
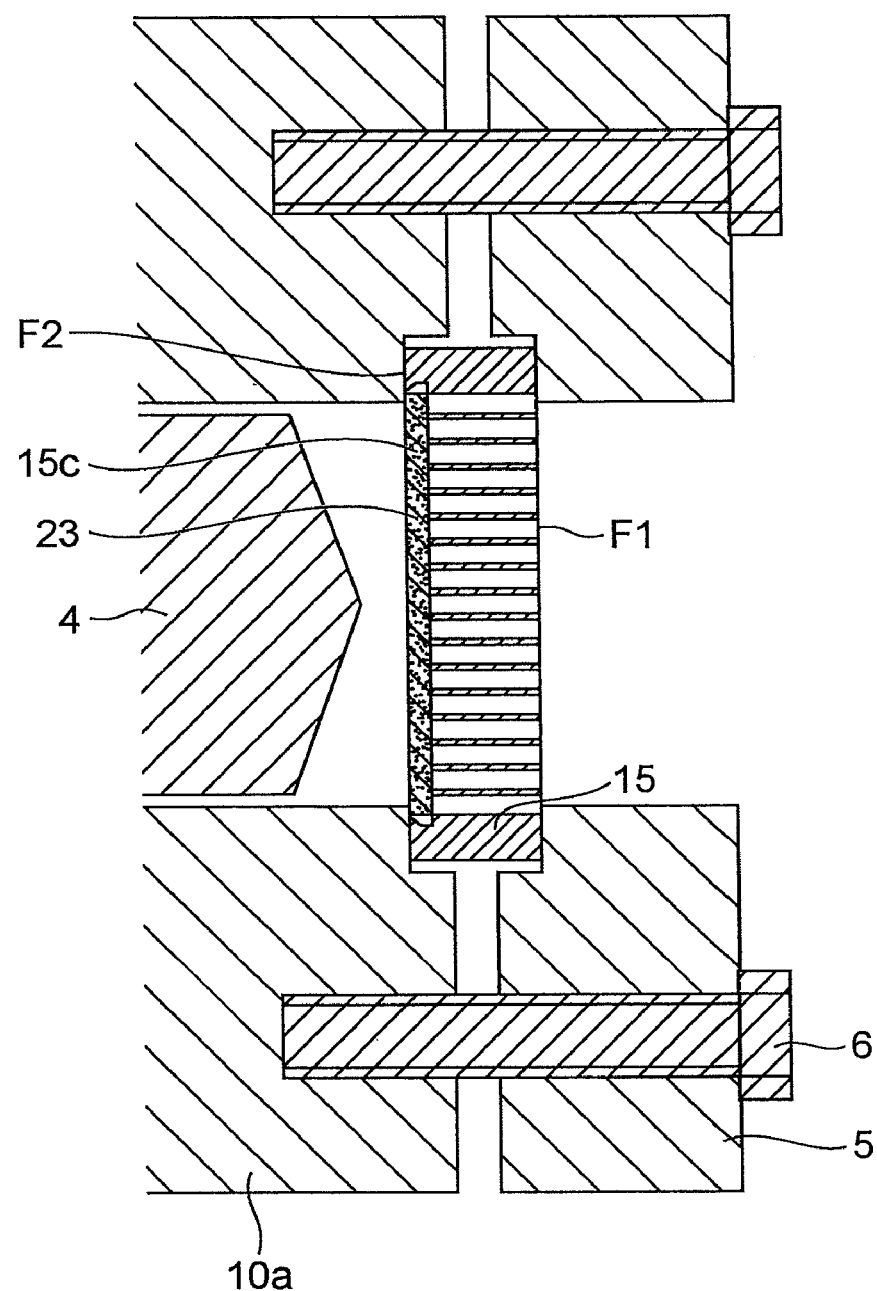
FIG. 12 is a schematic cross-sectional view illustrating an example of the filter mechanism of the conventional filter device.

Conventionally, when the breaker plate 15 is set to the filter device, it is installed with the surface F2 facing upstream and the sintered metal filter 23 disposed in the recessed part 15c thereof as shown in FIG. 12. In this case, leaking from the surface where the surface F2 and the sintered metal filter 23 abut with each other is easy to occur. In contrast, in the filter device 10 according to this embodiment, the surface F1 formed in a plane faces upstream and the sintered metal filter 13 and so on extend to the edge 15a and besides the seal member 18 is used and thereby it is enabled to suppress the leaking.

The filter device 10 has a die 19 installed on the downstream side of the filter mechanism 12 in the flow passage 10b. A strand in molten state is supplied to a water tank 20 by extruding the melt having passed through the filtration treatment out of the die 19. The solidified product obtained by cooling in the water tank 20 is supplied to a pelletizer 30, and the pellets of a polyolefin resin composition are produced by the treatment in the pelletizer 30.

(Raw Materials of Polyolefin Resin Composition)

Raw material compositions for use in the production of a polyolefin resin composition are described.

As a raw material composition, a plurality of polyolefin ingredients having intrinsic viscosities different from each other may be provided and used in combination. Alternatively, polyolefins obtained by polymerizing an olefin ingredient to produce a polyolefin and then producing a polyolefin having a different intrinsic viscosity in succession may be used. Such a polyolefin prepared by multistage polymerization contains a plurality of polyolefin ingredients having intrinsic viscosities different from each other. In this embodiment, a raw material composition containing a plurality of polyolefin ingredients having intrinsic viscosities different from each other which are directly polymerized by multistage polymerization is preferably used.

As a process for producing a raw material composition, for example, a batch polymerization method in which a polyolefin is produced in a polymerization tank (first step) and, subsequently after that, a polyolefin having a different intrinsic viscosity is produced in the same polymerization tank (second step) is included. As another production process, a continuous polymerization method in which two or more polymerization tanks are disposed in series and after polyolefin is produced (first step), the obtained polymer is transferred to the next polymerization tank, where a polyolefin having a different intrinsic viscosity is produced (second step) is included. Here, the number of the polymerization tanks respectively used in the first step and the second step may be one or two or more in the case of continuous polymerization method.

Examples of the polyolefin include a propylene homopolymer, a propylene-ethylene random copolymer, a propylene-ethylene-α-olefin terpolymer, a propylene-α-olefin copolymer, a propylene-ethylene-block copolymer, a high density polyethylene, a low density polyethylene, an ethylene-α-olefin copolymer and a butene-1 homopolymer. Of these, a propylene homopolymer, a propylene-ethylene random copolymer, a propylene-ethylene-α-olefin terpolymer and a propylene-ethylene block copolymer are preferable since they are hard to gelate when thermal deterioration occurs and to cause defects such as fisheyes.

As the α-olefin used for the propylene-α-olefin copolymer, the propylene-ethylene-α-olefin terpolymer and the ethylene-α-olefin copolymer, α-olefins having 4 to 12 carbon atoms are included, and examples thereof include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-dodecene. Of these, 1-butene, 1-pentene, 1-hexene and 1-octene are preferable, and 1-butene and 1-hexene are more preferable from the viewpoint of copolymerization property and economic efficiency.

When a propylene-ethylene copolymer is used as polyolefin, the ethylene content of the copolymer is typically 0.1 to 20 mass %, and preferably 0.5 to 10 mass %. When a propylene-α-olefin copolymer is used, the content of the α-olefin of the copolymer is typically 0.1 to 40 mass %, and preferably 1 to 30 mass %. When a propylene-ethylene-α-olefin terpolymer is used, the ethylene content of the copolymer is typically 0.1 to 20 mass %, and preferably 0.5 to 10 mass %, and the α-olefin content is typically 0.1 to 40 mass %, and preferably 1 to 30 mass %. When ethylene-α-olefin copolymer is used, the content of the α-olefin of the copolymer is typically 0.1 to 30 mass %, and preferably 1 to 20 mass %.

Examples of the polymerization method of olefin include a solvent polymerization method with an inert hydrocarbon solvent, a bulk polymerization method using a liquid monomer as a solvent, and a vapor phase polymerization method performed in gas monomers. As a method to obtain a raw material composition containing a plurality of polyolefin ingredients having intrinsic viscosities different from each other by direct polymerization, a batch polymerization method performed in batches, a vapor phase-vapor phase polymerization method and a liquid phase-vapor phase polymerization method performed continuously are included, and among these, a vapor phase-vapor phase polymerization method and a liquid phase-vapor phase polymerization method performed continuously are preferable from the viewpoint of productivity.

The above polyolefin can be obtained using, for example, a Ti—Mg type catalyst comprising a solid catalyst ingredient in which a magnesium compound is complexed with a Ti compound, a catalyst system in which an organoaluminum compound and a third ingredient such as an electron-donating compound as required are combined with this solid catalyst ingredient or a metallocene catalyst. More specifically, catalyst systems described in Japanese Patent Laid-Open No. 61-218606, Japanese Patent Laid-Open No. 61-287904 and Japanese Patent Laid-Open No. 07-216017 are included.

In this embodiment, it is preferable to use a raw material composition containing a polyolefin ingredient (A) having an intrinsic viscosity of 3 to 15 dl/g and a polyolefin ingredient (B) having an intrinsic viscosity of 0.5 to 3 dl/g. In addition, it is more preferable that the viscosity ratio ($[\eta]_A/[\eta]_B$) of the polyolefin ingredient (A) to the polyolefin ingredient (B) be in a range of 1.5 to 30. This makes it possible to obtain a polyolefin resin composition in which occurrence of fisheye and occurrence of processing defects such as "eye mucus" or "streaks" can be still more suppressed. Here, it is preferable that the intrinsic viscosity of the whole raw material composition be 1.0 to 3.0 dl/g from a viewpoint of obtaining a still more homogeneous polyolefin resin composition.

When the polyolefin ingredient having the above-mentioned intrinsic viscosity is used, the content of the polyolefin ingredient (A) is preferably 0.05 to 70 mass %, more preferably 0.5 to 40 mass % based on the total amount of the polyolefin ingredients (A) and (B). In the meantime, the content of the polyolefin ingredient (B) is preferably 30 to 99.95 mass %, more preferably 60 to 99.5 mass %.

Additives such as an antioxidant such as a phenolic antioxidant or a phosphorus antioxidant, a neutralizing agent, a lubricant, an antistatic agent, an anti-blocking agent, a fluorinated resin and a polyethylene resin may be incorporated into the raw material composition in order to improve the performance of the produced polyolefin resin composition.

The addition method of the additives is not limited in particular as long as a homogeneous polyolefin resin composition can be obtained. For example, a method in which powder of the raw material composition and various additives are blended using mixing equipment such as a Henschel mixer and then the mixture is directly pelletized, a method in which an additive masterbatch having a relatively high concentration is pelletized using a high kneading extruder such as a twin screw extruder and then blended with the raw material composition, and a method in which additives are molten and added to the raw material composition in a liquid state and similar methods can be adopted.

Examples of the phenolic antioxidant include 2,6-di-tert-butyl-4-methylphenol, tetrakis[methylene-3-(3',5'-di-tert-butyl-4-hydroxyphenyl)propionate]methane, octadecyl-3-(3,5-di-tert-butyl-4-hydroxyphenyl)propionate, 3,9-bis[2-{3-(3-tert-butyl-4-hydroxy-5-methylphenyl)propionyloxy}-1,1-dimethylethyl]-2,4,8,10-tetraoxaspiro[5.5]undecane, tris(3,5-di-tert-butyl-4-hydroxybenzyl)isocyanurate, triethylene glycol-N-bis-3-(3-tert-butyl-5-methyl-4-hydroxyphenyl) propionate, 1,6-hexanediol bis[3-(3,5-di-tert-butyl-4-hydroxyphenyl)propionate], 2,2-thiobis-diethylenebis[3-(3,5-di-tert-butyl-4-hydroxyphenyl)propionate], and α-tocopherols represented by vitamin E.

Examples of the phosphorus antioxidant include tris(nonylphenyl) phosphite, tris(2,4-di-tert-butylphenyl)phosphite, distearylpentaerythritol diphosphite, bis(2,4-di-tert-butylphenyl)pentaerythritol diphosphite, bis(2,4-di-tert-butyl-6-methylphenyl)pentaerythritol diphosphite, bis(2,6-di-tert-butyl-4-methylphenyl)pentaerythritol diphosphite, bis(2,4-dicumylphenyl)pentaerythritol diphosphite, tetrakis(2,4-di-tert-butylphenyl)-4,4'-diphenylene diphosphite, 2,2'-methylenebis(4,6-di-tert-butylphenyl) 2-ethylhexylphosphite, 2,2'-ethylidenebis(4,6-di-tert-butylphenyl)fluorophosphite, bis(2,4-di-tert-butyl-6-methylphenyl)ethylphosphite, 2-(2,4,6-tri-tert-butylphenyl)-5-ethyl-5-butyl-1,3,2-oxaphosphorinane, 2,2',2"-nitrilo[triethyl-tris(3,3',5,5'-tetra-tert-butyl-1,1'-biphenyl-2,2'-diyl)]phosphite.

As the neutralizing agent, calcium stearate, magnesium stearate, hydrotalcite, calcium hydroxide are included.

Examples of the lubricant include higher fatty acid amides and higher fatty acid esters. Examples of the antistatic agent include glycerine ester of a fatty acid having 8 to 22 carbon atoms, sorbitan acid esters and polyethylene glycol esters. Examples of the anti-blocking agent include silica, calcium carbonate and talc.

(Process for Producing Polyolefin Resin Composition)

Next, the process for producing a polyolefin resin composition using a production system 50 mentioned above is described. The production process according to this embodiment comprises a melting step for preparing a melt containing two or more polyolefin ingredients; a filtration step for filtering a melt with the filter device 10 and a molding step for obtaining pellets from the filtered fluid.

First, a raw material composition containing a plurality of polyolefin ingredients having different limiting viscosities is cast into the hopper 2. The raw material composition is kneaded by turning the screw 4 while heating the raw materials to 160 to 300° C. to obtain a melt which contains a plurality of polyolefin ingredients (melting step).

The melt is further transferred to the downstream side of the flow passage 10b by the screw 4. The melt is filtered with a sintered metal filter 13 of the filter mechanism 12 (filtration step). The filtration rate for filtering the melt is preferably 1 to 150 cm/min. When the filtration rate is less than 1 cm/min, sintered metal filter having a large area for securing a sufficient throughput per unit time is needed, and the size of the facilities becomes excessively large, and equipment costs tend to increase. On the other hand, when the filtration rate is more than 150 cm/min, the sintered metal filter 13 is liable to be deformed at openings 15d of the breaker plate 15, and the filtration accuracy tends to be deteriorated. In addition, the filtration pressure becomes high, which tends to impose an excessive load on the filter device 10.

It is preferable to decide a filtration area so that the filtration rate of the melt in the filter device 10 may become 1 to 150 cm/min. The filtration rate is more preferably within 10 to 100 cm/min, still more preferably within 30 to 80 cm/min from the viewpoint of compatibility of high productivity and the fisheye reduction effect. The difference between the pressures at the inlet and the outlet of the filter device is preferably 3 to 35 MPa, more preferably 10 to 30 MPa.

The a melt obtained by the filtration treatment is extruded from the die 19 and supplied into a water tank 20. The strand solidified in the water tank 20 is cut with a pelletizer 30 to obtain pellets consisting of polyolefin resin compositions.

The thus obtained pellets can be used, for example, for the production of automotive materials, household appliance materials, OA machinery materials, building materials, sheets, various bottles, etc. From the viewpoint of fluidity for molding various parts from these pellets, the polyolefin resin composition has preferably a melt flow rate (MFR) of 0.1 to 300 g/10 min, more preferably 1 to 50 g/10 min. Here, the melt flow rate means a value measured at 230° C.

According to the production system 50 comprising a filter device 10 and the production process using this which are described above, pellets consisting of a polyolefin resin compositions from which contaminants have been removed sufficiently can be obtained. Molded products having excellent appearance with sufficiently little occurrence of fisheyes can be produced using these pellets. In addition, polyolefin resin compositions can be produced effectively in the filter device 10 even in case of setting the filtration pressure comparatively highly since the leak can be suppressed sufficiently.

Second Embodiment

Figure 6:
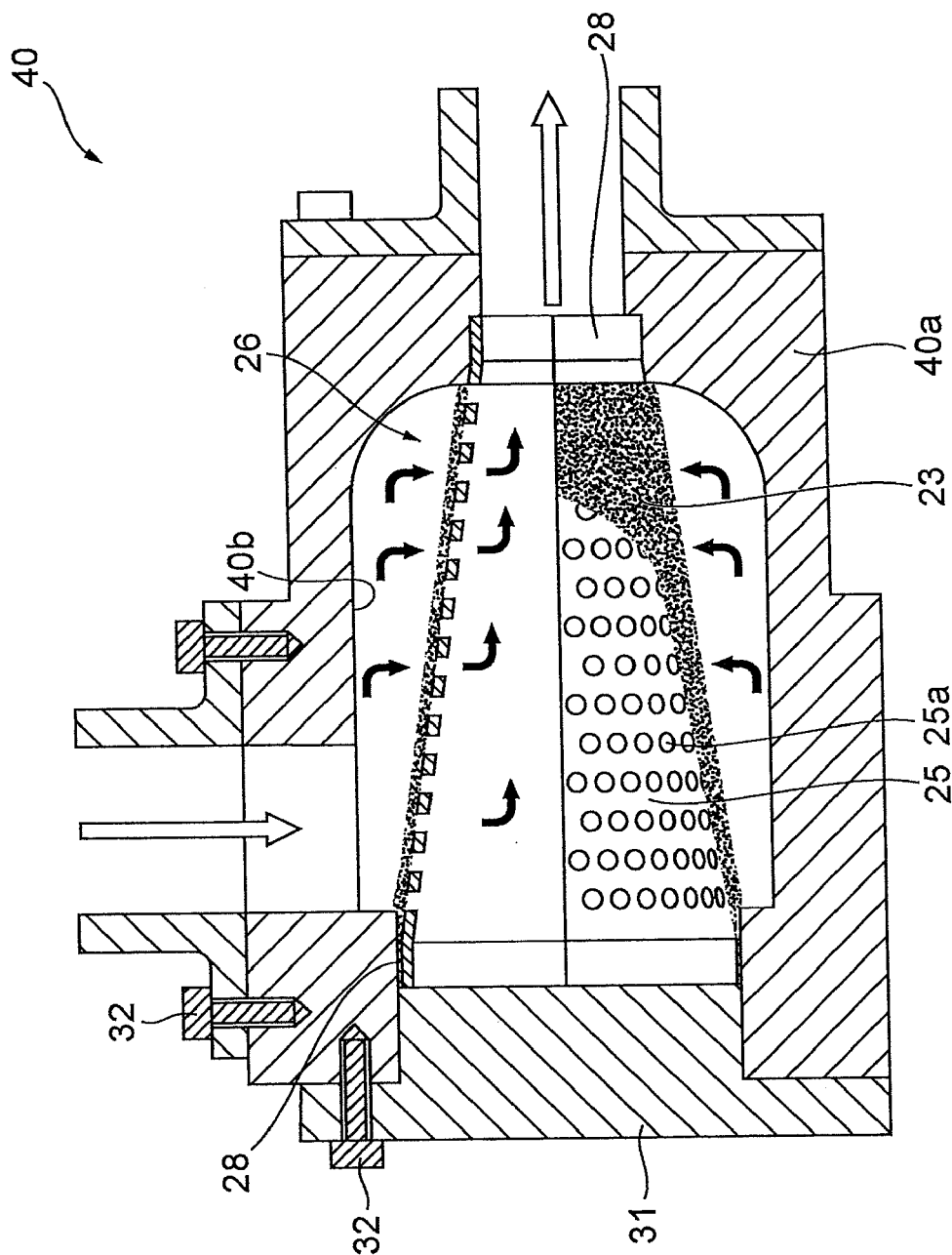
FIG. 6 is a partial sectional view illustrating the filter mechanism of a filter device according to the second embodiment.

The second embodiment of the production system of a polyolefin resin composition is described by referring to FIGS. 6 to 10. The production system according to the second embodiment is different from the production system 50 according to the above first embodiment in that the layered unit 26 installed in the flow passage 40b of filter device 40 has a cylindrical form as shown in FIG. 6. The layered unit 26 comprises the sintered metal filter 23, the wire netting 24a, the breaker plate 25, etc. and the shape of these members is a cylindrical form. Here, those having the similar filtration accuracy, material properties and line diameters as the sintered metal filter 13, the wire netting 14a, 14b and the breaker plate 15 in the first embodiment can be use as the sintered metal filter 23, the wire netting 24a, 24b and the breaker plate 25, respectively.

FIG. 6 is a partial sectional view illustrating the section of the layered unit 26 and the surface shape of the respective members. The layered unit 26 can be detachably attached to the main body section 40a of the device with a flange 31 and bolts 32. These members are fixed to the main body section 40a of the device through the seal member 28. Here, the melt supplied from the upper part is filtered through the sintered metal filter 23 of the layered unit 26 and transferred to the downstream side as shown with an arrow in FIG. 6.

FIG. 7(a) is a schematic view illustrating the layered unit 26 in which the sintered metal filter 23 is disposed on the most outside. The sintered metal filter 23 is obtained by rolling a sintered metal sheet into a cylinder and then pressure bonding the joint of the rolled sintered metal sheet with a pressure bonding member 23a. The both edges of the sintered metal filter 23 are covered with the seal member 28.

FIG. 7(b) is a schematic cross-sectional view illustrating a joint of the sintered metal filter 23 pressure bonded with a pressure bonding member 23a. Members made of a resin or metal members can be use as the pressure bonding member 23a. FIG. 7(c) is a schematic cross-sectional view illustrating the edge of the sintered metal filter 23, the wire netting 24a, 24b and the breaker plate 25. The end parts of the respective members are integrally covered with a seal member 28. Here, the sintered metal filter 23, the wire netting 24a, the wire netting 24b and the breaker plate 25 are disposed in this order from the upstream side to the downstream side of the flow passage 40b.

Figure 8:
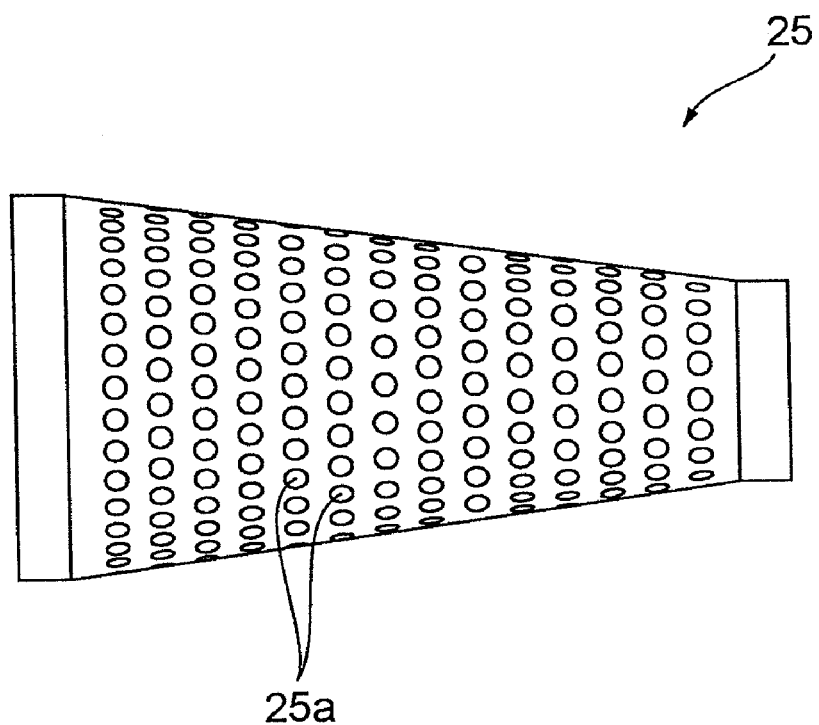
FIG. 8 is a side view illustrating an example of the cylindrical breaker plate.

FIG. 8 is a side view illustrating the breaker plate 25. The breaker plate 25 is provided to support the sintered metal filter 23, the wire netting 24a and so on. The breaker plate 25 is formed as shown in FIG. 8 so that the diameter may decrease from the upstream side to the downstream side. The breaker plate 25 has a plurality of openings 25a penetrating in the thickness direction, and the aperture ratio of the breaker plate 25 is 30 to 60%.

FIG. 9(a) is a schematic view illustrating another constitution of the cylindrically shaped layered unit which can be applied to the filter device 40. The layered unit 36 shown in the drawing is different from the layered unit 26 illustrated in FIG. 7 in that the joint of sintered metal filter 23 is pressure bonded with a pressure bonding member 33a and that the breaker plate 35 is fixed with screws 533b. FIG. 9(b) is a schematic cross-sectional view illustrating the joint fixed to the sintered metal filter 23 with a pressure bonding member 33a and screws 33b. FIG. 9(c) is a schematic cross-sectional view illustrating the edge of the sintered metal filter 23, the wire netting 24a, 24b and the breaker plate 35.

Figure 10:
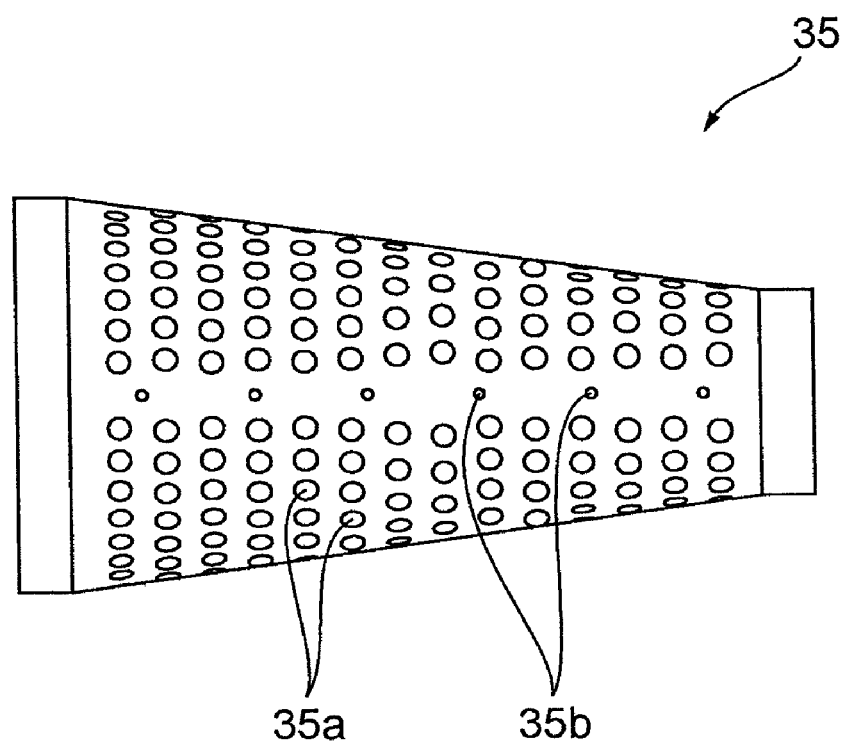
FIG. 10 is a side view illustrating another example of the cylindrical breaker plate.

FIG. 10 is a side view illustrating the breaker plate 35. The breaker plate 35 is different from the breaker plate 25 illustrated in FIG. 8 in that the former has an opening 35b to insert the screw 33b in addition to the opening 35a.

Preferable embodiments of the present invention have been described in detail, but the present invention is not limited to the embodiments mentioned above. For example, the sintered metal filter 13, the wire netting 14a, breaker plate 15 and so on, which are illustrated as those in a circular or cylindrical form in the first and the second embodiments, but the outer shape of these may be oval, cone, etc. The case where those in a cylindrical or conic shape are adopted is advantageous as compare with the case where those in a circular or conic elliptic shape are adopted in that it is easy to increase the filtration area and therefore the filtration treatment can be carried out at a lower filtration pressure in the former case.

In addition, the case where the joint of the sintered metal filter is pressure bonded with a pressure bonding member has been exemplified in the second embodiment, but a sintered metal filter having no joint on the surface may be used from a viewpoint of more surely reducing the leak.

Furthermore, a production system for producing polyolefin resin compositions containing two or more polyolefin ingredients has been illustrated in the embodiments mentioned above, but the filter device according to the present invention may be applied for producing polyolefin resin compositions consisting of one kind of polyolefin ingredient. In this case, contaminants contained in the raw materials can be sufficiently removed by filtering the melt of raw materials and occurrence of fisheyes and the like defects caused by contaminants can be reduced. In addition, a step of kneading the filtered fluid may be further carried out after the filtration treatment of the melt of respective polyolefin ingredients is performed.

In addition, a case where pellets consisting of polyolefin resin compositions are produced has been exemplified in the embodiment mentioned above, but films or sheets for various uses (for example, food packaging or industrial use) may be produced in substitution for pellets. Polyolefin films and sheets having excellent appearance can be produced by using the filtered fluid passed through the treatment with a filter device according to the present invention.

Figure 11:
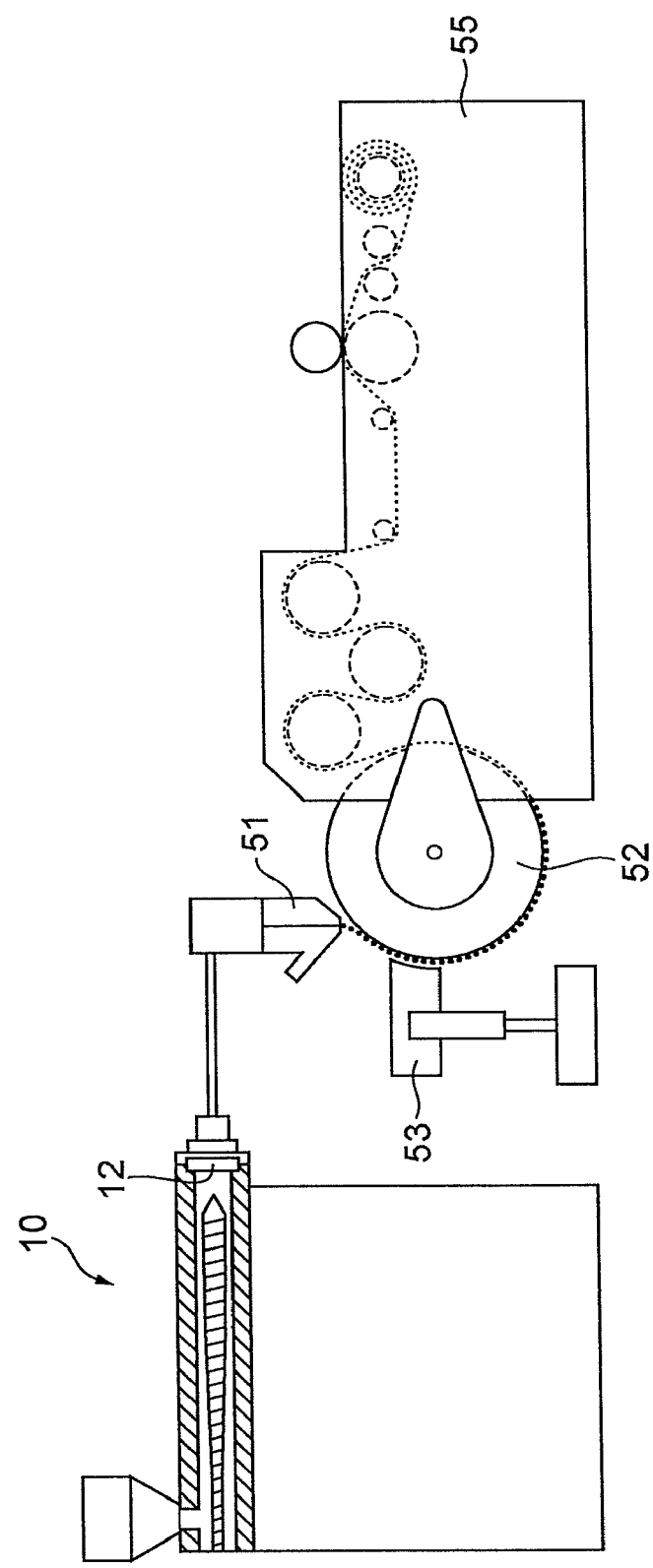
FIG. 11 is a schematic view illustrating another embodiment of the production system comprising a filter device according to the present invention.

For a film production apparatus, an inflation film production apparatus or a T-die film production apparatus in combination with a filter device according to the present invention is preferable. For example, when a T-die film is produced, a molten film extruded out of the die 51 is cooled to be solidified while extending the molten film with chill-rolls 52 and an air chamber apparatus 53 to the preferred thickness as shown in FIG. 11. Then, the film with a predetermined thickness is finally wound up with a rewinder 55. Here, the processing conditions when a polyolefin film is produced with a T-die film production apparatus are as follows.

| | |
|---|---|
| Temperature of the molten resin to be extruded out of the die lip | 180 to 300° C., |
| Shearing rate of the molten resin at the die lip | 10 to 1500 $sec^{-1}$, |
| Rotation speed of the chill-roll | 10 to 500 m/min, |
| Temperature of the chill-roll | 10 to 80° C., |
| Film thickness | 5 to 200 μm. |

The polyolefin films or sheets produced by the method mentioned above may be subjected to extension processing to finally obtain a film or a sheet. For example, as for the extension method, one axis or two axes extension by roll extension method, tenter frame extension method, tubular extension method can be exemplified.

EXAMPLES

Hereinbelow, the present invention is more specifically described based on Examples and Comparative Examples, but the present invention is not limited to the following Examples at all. Respective physical properties and evaluations in the respective Examples and Comparative Examples were determined in accordance with the following methods.

(1) Content (unit: mass %) of respective polyolefin ingredients (ingredient (A), ingredient (B))

The content (PA) of the ingredient (A) and the content (PB) of the ingredient (B) are determined from mass balance when the ingredient (A) and the ingredient (B) are produced.

(2) Intrinsic Viscosity ([η], Unit: dl/g)

The measurement was performed using an Ubbelohde viscometer in tetralin at 135° C. When the ingredient (A) was produced first, the intrinsic viscosity ($[\eta]_B$) of the ingredient (B) was determined by the expression (I) from an intrinsic viscosity $[\eta]_A$ of the ingredient (A) measured after the end of production of the ingredient (A), an intrinsic viscosity ($[\eta]_{AB}$) of the polyolefin ingredient measured after the end of production of the second step, and a content (PA) of the ingredient (A) and a content (PB) of the ingredient (B). When the ingredient (B) was produced first, the intrinsic viscosity ($[\eta]_A$) of the ingredient (A) was similarly determined.

$$[\eta]_A \times (PA/100) + [\eta]_B \times (PB/100) = [\eta]_{AB} \quad (I)$$

(3) Filtration Accuracy (Unit: μm)

A filtration test was performed based on JIS-B8356, and the size of particles 95% of which were trapped was measured and thereby the filtration accuracy of the sintered metal filter was determined.

(4) Fisheye (Unit: Per Square Meter²)

The number of defects having a diameter (in the TD direction) of 100 μm or more (fisheyes) was measured with a plain surface defect inspection equipment (product name DIPS; CCD camera 4,096 pixels, 160 MHz×2) produced by Nireco installed in the T-die film producing apparatus.

Example 1

Polypropylene Resin I

Propylene-ethylene-1-butene random copolymer (produce by Sumitomo Chemical Co., Ltd., product name: FLX81K9) was used.

Polypropylene Resin II

Pellet produced as follows were used. At first, a propylene polymer part (ingredient (A)) was produced in the presence of a Ti—Mg based Ziegler Natta type catalyst in liquefied propylene (first step). The polypropylene particles obtained at the first step were supplied to the gas phase to further produce a propylene polymer part (ingredient (B)) (second step). The obtained resin powder had an ingredient (A) content of 11 mass %, intrinsic viscosity $[\eta]_A$ of the ingredient (A) of 7.9 dl/g and intrinsic viscosity $[\eta]_B$ of the ingredient (B) of 1.1 dl/g. 100 mass parts of the obtained resin powder, 0.15 mass part of a phenolic antioxidant (produced by Ciba Speciality Chemicals Co., Ltd., product name: Irganox1010) and 0.1 mass part of a phosphorus antioxidant (produced by Ciba Speciality Chemicals Co., Ltd., product name: Irgafos168) were mixed. The mixture was introduced into a twin-screw granulating machine and pelletized.

(Production of Film)

A film was prepared as follows using a coextrusion T-die film processing device provided with an extruder M having a flow passage whose inside diameter was 93 mm; an extruder A having a flow passage whose inside diameter was 65 mm; and an extruder B having a flow passage whose inside diameter was 68 mm.

First, circular layered units for forcing molten raw materials to pass therethrough were installed respectively in the flow passage of the extruder M and the extruders A and B. Layered units in which a sintered metal filter, a plurality of wire nettings and a breaker plate disposed in this order from the upstream side to the downstream side of the flow passage were fixed with bolts between a flange of the outlet side of each extruder and a flange of the base-end side of the feeding pipe.

Constitution of the layered units attached to the extruder M and the extruder A is as shown below. A sealing tape made of Teflon (registered trademark) was wound around the edges of the sintered metal filter and so on and layered units were fixed in the main body of the extruders M and A through this sealing tape (see FIG. 2).

Sintered metal filter: Filtration accuracy: 60 μm (product name: Naslon NF13D produced by Nippon Seisen Co., Ltd.), Wire netting: Line diameter 0.22 mm, Mesh count: 50 mesh, two pieces, Breaker plate for the extruder M: Diameter: 110 mm, Thickness of the flow passage surface: 18 mm, Diameter of the flow passage surface: 93 mm, Layered unit fixation width: 8 mm, Diameter of the opening: 4 mm, Number of the opening: 217, Aperture ratio: 40%.

Breaker plate for the extruder A: Diameter: 85 mm, Thickness of the flow passage surface: 18 mm, Diameter of the flow passage surface: 68 mm, Layered unit fixation width: 8 mm, Diameter of the opening: 4 mm, Number of the opening: 101, Aperture ratio: 35%.

Constitution of the layered units attached to the extruder B is as shown below. A sealing tape made of Teflon (registered trademark) was wound around the edges of the sintered metal filter and so on and a layered unit was fixed in the main body of the extruder B through this sealing tape (see FIG. 2).

Sintered metal filter: Filtration accuracy: 10 μm (product name: Naslon NF06D produced by Nippon Seisen Co., Ltd.), Wire netting a to d: Line diameter 0.22 mm, Mesh count: 50 mesh, four pieces, Breaker plate for the extruder B: Diameter: 85 mm, Thickness of the flow passage surface: 18 mm, Diameter of the flow passage surface: 68 mm, Filter medium fixed width: 8 mm, Diameter of the opening: 4 mm, Number of the opening: 101, Aperture ratio: 35%.

Here, a torque of 30 kg·m was imposed on eight bolts of M30 respectively, when the layered unit was fixed in the extruder M. A torque of 30 kg·m was imposed on six bolts of M35 respectively, when the layered unit was fixed in the extruders A and B.

After the layered units were installed to each extruder and the temperature of the film process machine became stable, polypropylene polymer I was supplied to the extruders A and M and polypropylene polymer II was supplied to the extruder B, respectively. Extrusion outputs for the extruders A, M and B were set to 33 kg/hr, 100 kg/hr and 33 kg/hr respectively and polypropylene resins I, II were melted and kneaded and were extruded from the T-die (width 1250 mm, gap 0.8 mm). The molten extruded films were cooled and solidified with a chill-roll (rotation rate: 50 m/min) and a film having a thickness of 50 μm was obtained. The temperatures of the flow passage of the extruder, the feeding pipe and the feeding block were regulated so that they would become 245° C. The temperature of the T-die was regulated to 260° C. Water for regulating the temperature of the chill-roll was at 30° C., and an air chamber device was used to assist chill-roll-chilling.

Comparative Example 1

The layered unit was fixed without using a seal member while the sintered metal filter and so on were placed within a recess of the breaker plate when the layered unit was arranged on the main body of extruder B (see FIG. 12). A film was produced in the same way as in Example 1 except that the sintered metal filter and so on were not fixed with a seal member.

Example 2

A film was produced in the same way as in Example 1 except that the disposition of the wire nettings in the layered unit which was attached to the extruder B and the conditions for producing a film were changed as follows. Here, the wire netting a, the wire netting b and the wire netting c were arranged so that they would be disposed in this order from the upstream side to the downstream side of the flow passage.

Wire netting a: Line diameter 0.22 mm, Mesh count: 50 mesh,
Wire netting b: Line diameter 0.29 mm, Mesh count: 20 mesh,
Wire netting c: Line diameter 0.47 mm, Mesh count: 10 mesh,
Extrusion output of resin I by the extruder A: 50 kg/hour,
Extrusion output of resin I by the extruder M: 100 kg/hour,
Extrusion output of resin II by the extruder B: 10 kg/hour,
Temperature of the thermoregulation water of the chill-roll: 40° C.

Comparative Example 2

A film was produced in the same way as in Example 1 except that the disposition of the wire nettings in the layered unit which was attached to the extruder B and the conditions for producing a film were changed as follows. Here, the wire netting a, the wire netting b and the wire netting c were arranged so that they would be disposed in this order from the upstream side to the downstream side of the flow passage.

Wire netting a: Line diameter 0.47 mm, Mesh count: 10 mesh,
Wire netting b: Line diameter 0.29 mm, Mesh count: 20 mesh,
Wire netting c: Line diameter 0.22 mm, Mesh count: 50 mesh,
Extrusion output of resin I by the extruder A: 50 kg/hour,
Extrusion output of resin I by the extruder M: 100 kg/hour,
Extrusion output of resin II by the extruder B: 10 kg/hour,
Temperature of the thermoregulation water of the chill-roll: 40° C.

Comparative Example 3

A film was produced in the same way as in Example 1 except that the disposition of the wire nettings in the layered unit which was attached to the extruder B and the conditions for producing a film were changed as follows. Here, the wire netting on the upstream side, the sintered metal filter, the wire netting a and the wire netting b were arranged so that they would be disposed in this order from the upstream side to the downstream side of the flow passage.

Wire netting on the upstream side: Line diameter 0.29 mm, Mesh count: 20 mesh,
Sintered metal filter: Filtration accuracy 10 μm (product name Naslon NF06D produced by Nippon Seisen Co., Ltd.),
Wire netting a: Line diameter 0.47 mm, Mesh count: 10 mesh,
Wire netting b: Line diameter 0.47 mm, Mesh count: 10 mesh,
Extrusion output of resin I by the extruder A: 50 kg/hour,
Extrusion output of resin I by the extruder M: 100 kg/hour,
Extrusion output of resin II by the extruder B: 10 kg/hour,
Temperature of the thermoregulation water of the chill-roll: 40° C.

Example 3

A film was produced in the same way as in Example 1 except that the disposition of the wire nettings in the layered unit which was attached to the extruder B and the conditions for producing a film were changed as follows. Here, the wire netting on the upstream side, the sintered metal filter, the wire netting a, the wire netting b, the wire netting c and the wire netting d were arranged so that they would be disposed in this order from the upstream side to the downstream side of the flow passage.

Wire netting on the upstream side: Line diameter 0.10 mm, Mesh count: 80 mesh,
Sintered metal filter: Filtration accuracy 10 μm (product name Naslon NF06D produced by Nippon Seisen Co., Ltd.),
Wire netting a: Line diameter 0.10 mm, Mesh count: 80 mesh,
Wire netting b: Line diameter 0.22 mm, Mesh count: 50 mesh,
Wire netting c: Line diameter 0.22 mm, Mesh count: 50 mesh,
Wire netting d: Line diameter 0.22 mm, Mesh count: 50 mesh,
Extrusion output of resin I by the extruder A: 45 kg/hour,
Extrusion output of resin I by the extruder M: 130 kg/hour,
Extrusion output of resin II by the extruder B: 45 kg/hour,
Film thickness: 70 μm,
Temperature of the thermoregulation water of the chill-roll: 40° C.

Example 4

A film was produced in the same way as in Example 3 except that a sintered metal filter having filtration accuracy of 20 g/m was used as the sintered metal filter attached to the extruder B.

Metal sintered filter: Filtration accuracy 20 μm (product name Naslon NF08D produced by Nippon Seisen Co., Ltd.).

The constitution of the layered units, filtration conditions and evaluation results in the Examples and Comparative Examples mentioned above are shown in Table 1.

TABLE 1

|  |  | Ex. 1 | Com. Ex. 1 | Ex. 2 | Com. Ex. 2 | Com. Ex. 3 | Ex. 3 | Ex. 4 |
| --- | --- | --- | --- | --- | --- | --- | --- | --- |
| Raw material filtered at extruder B |  | Resin II | Resin II | Resin II | Resin II | Resin II | Resin II | Resin II |
| Wire netting disposed on the upstream side of sintered metal filter | Line diameter | — | — | — | — | 0.29 mm | 0.10 mm | 0.10 mm |
|  | Mesh count | — | — | — | — | 20 mesh | 80 mesh | 80 mesh |
| Sintered metal filter | Filtration accuracy | 10 μm | 10 μm | 10 μm | 10 μm | 10 μm | 10 μm | 20 μm |

TABLE 1-continued

|  |  |  | Ex. 1 | Com. Ex. 1 | Ex. 2 | Com. Ex. 2 | Com. Ex. 3 | Ex. 3 | Ex. 4 |
|---|---|---|---|---|---|---|---|---|---|
| Wire netting disposed on the downstream side of sintered metal filter | Wire netting a | Line diameter | 0.22 mm | 0.22 mm | 0.22 mm | 0.47 mm | 0.47 mm | 0.10 mm | 0.10 mm |
|  |  | Mesh count | 50 mesh | 50 mesh | 50 mesh | 10 mesh | 10 mesh | 80 mesh | 80 mesh |
|  | Wire netting b | Line diameter | 0.22 mm | 0.22 mm | 0.29 mm | 0.29 mm | 0.47 mm | 0.22 mm | 0.22 mm |
|  |  | Mesh count | 50 mesh | 50 mesh | 20 mesh | 20 mesh | 10 mesh | 50 mesh | 50 mesh |
|  | Wire netting c | Line diameter | 0.22 mm | 0.22 mm | 0.47 mm | 0.22 mm | — | 0.22 mm | 0.22 mm |
|  |  | Mesh count | 50 mesh | 50 mesh | 10 mesh | 50 mesh | — | 50 mesh | 50 mesh |
|  | Wire netting d | Line diameter | 0.22 mm | 0.22 mm | — | — | — | 0.22 mm | 0.22 mm |
|  |  | Mesh count | 50 mesh | 50 mesh | — | — | — | 50 mesh | 50 mesh |
| Fixing at edge of sintered metal filter |  |  | Fixed | Not fixed | Fixed | Fixed | Fixed | Fixed | Fixed |
| Breaker plate |  | Thickness | 18 mm | 18 mm | 18 mm | 18 mm | 18 mm | 18 mm | 18 mm |
|  |  | Aperture ratio | 35% | 35% | 35% | 35% | 35% | 35% | 35% |
| Filtration rate (cm/min) |  |  | 17 | 17 | 5 | 5 | 5 | 23 | 23 |
| Number of fisheye (per square meter$^2$) |  |  | 0.1 | 90 | 0.2 | 6 | 9 | 0.1 | 0.5 |

What is claimed is:

1. A device for filtering a melt of a polyolefin resin composition containing one or two or more polyolefin ingredients, wherein the device comprises:
   a main body having a flow passage through which the melt is transferred;
   a sintered metal filter having a filtration accuracy of 1 to 100 μm;
   a wire netting having a line diameter of 0.01 to 0.25 mm and abutting the sintered metal filter on one side thereof;
   a supporting member supporting the sintered metal filter and the wire netting, having a thickness of 10 to 100 mm and having a plurality of openings penetrating in the thickness direction with an aperture ratio of 30 to 60%; and
   a seal member disposed so as to cover the edge of the sintered metal filter;
   wherein the sintered metal filter, the wire netting and the supporting member are disposed in this order from the upstream to the downstream of the flow passage; and
   the sintered metal filter is fixed to the main body through the seal member.

2. The filter device according to claim 1, wherein the sintered metal filter, the wire netting and the supporting member are detachably attached to the main body.

3. The filter device according to claim 1, wherein all of the outer shapes of the sintered metal filter, the wire netting and the supporting member are circular.

4. The filter device according to claim 1, wherein all of the outer shapes of the sintered metal filter, the wire netting and the supporting member are cylindrical.

5. The filter device according to claim 4, wherein the sintered metal filter having a cylindrical outer shape is prepared by rolling a sintered metal body sheet into a cylinder and then pressure bonding a joint of the rolled sintered metal sheet with a resin member or a metal member.

6. The filter device according to claim 4, wherein the sintered metal filter having a cylindrical outer shape has no joint on a surface thereof.

7. A process for producing a polyolefin resin composition, wherein the process comprises:
   a melting step for preparing a melt containing one or two or more polyolefin ingredients; and
   a filtration step for filtering a melt molten substances with a filter device according to claim 1.

* * * * *